July 8, 1941.  J. O. THIBAULT ET AL  2,248,833
REAR VISION MIRROR
Filed Dec. 3, 1937
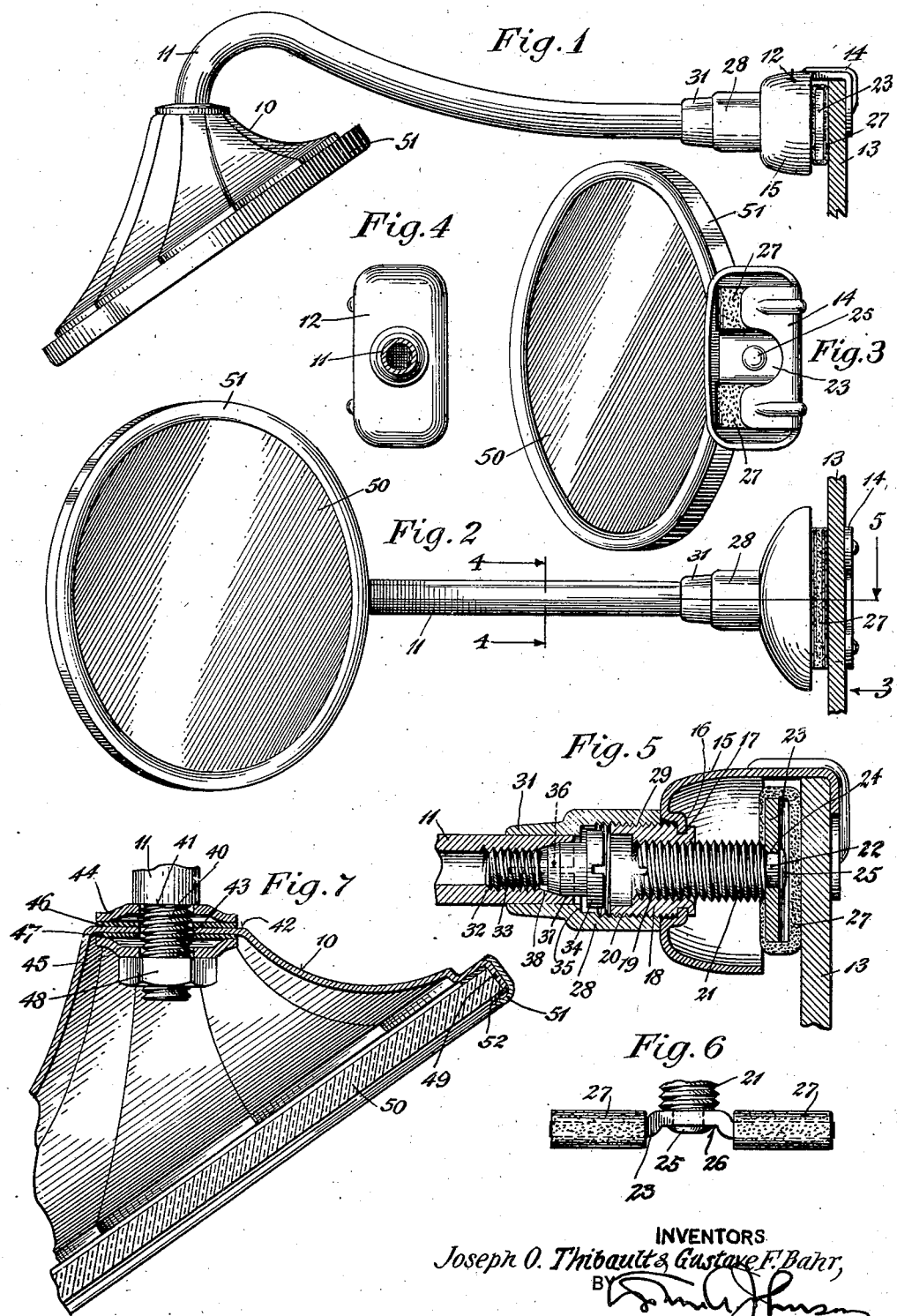
INVENTORS
Joseph O. Thibault & Gustave F. Bahr,
BY
ATTORNEY Patented July 8, 1941

2,248,833

UNITED STATES PATENT OFFICE 2,248,833

REAR VISION MIRROR

Joseph O. Thibault, Bridgeport, and Gustave F. Bahr, Fairfield, Conn., assignors to Casco Products Corporation, Bridgeport, Conn., a corporation of Connecticut Application December 3, 1937, Serial No. 177,900

10 Claims. (Cl. 248—226)

This invention relates to rear vision mirrors for automobiles and the like, and more particularly, to one which is mounted outside the tonneau of the vehicle in front and to the side of the operator so that unobstructed vision may be had to the rear of the vehicle.

Such rear vision mirrors have been in use for many years, but there has always been the difficulty of holding the mirror in desired adjusted position so that the operator without moving his head could see directly behind the vehicle and yet permit the mirror to be adjusted without the use of tools to suit the driving positions or heights of different drivers.

This difficulty is obviated by the present invention by the provision of improved means for movably mounting the mirror proper on its supporting rod and the supporting rod upon its bracket, with which improved means the rod is firmly yet movably carried by the bracket and the mirror is firmly but movably carried by the rod.

Further, according to the present invention, the resistance to movement of the mirror on the rod and the rod on the bracket is variable, so that, in cases where there is present a great deal of vibration which would tend to cause movement, the resistance to movement may be increased.

Another difficulty with exterior rear vision mirrors heretofore proposed is that care and considerable judgment was required in clamping the bracket to the margin of a door or doorframe in order for the device to be securely fastened thereto against loosening due to vibration and jolting. This difficulty is avoided by the present invention by providing a very rigid and substantial bracket having a clamping shoe and a single clamping screw located between the ends of the shoe so that pressure produced by the screw is evenly distributed to the ends of the clamping shoe or jaw. With this novel construction, it is not necessary to adjust two separate screws as has been heretofore proposed so that they each have the same pressure (otherwise one would perform no service), and yet the clamp is effective over quite a wide area so as to make for a rigid construction.

Another difficulty with the previously proposed exterior rear vision mirrors is that the means which are used to clamp the device to the door or doorframe are visible and easily accessible, and, therefore, present a temptation to mischievous or dishonest persons to remove the device. In some cases, it has been proposed to use special heads on the clamping screws and to furnish a suitable tool with each device, but, with this construction, anyone in possession of the tool, or an easily made substitute, could easily remove the device.

This difficulty has been avoided by the present invention by so arranging the clamping means that the screw of the clamp is concealed from view, thereby discouraging any attempts by unauthorized persons to remove the device from its position on the car.

Another advantageous feature of the present invention is the elimination of the usual ball-and-socket joint between the mirror proper and its supporting rod which is one of the causes for the devices, heretofore proposed, getting easily out of adjustment. According to the present invention, instead of having a ball-and-socket joint, the mirror proper is rotatably mounted on the rod on an axis which is oblique to the plane of the mirror. By rotating the mirror on this oblique axis and simultaneously rotating the rod on its axis, the mirror can be set at any desired angle with relation to the operator's line of vision.

Other features and advantages will hereinafter appear.

In the drawing the herein similar reference connections refer to similar parts throughout the several views:

Figure 1 is a view of the mirror in side elevation.

Fig. 2 is a view of the mirror in bottom elevation.

Fig. 3 is another view of the mirror in elevation looking at Fig. 2 in the direction of the arrow 3 of that figure.

Fig. 4 is a view taken on the line 4—4 of Fig. 2.

Fig. 5 is a view taken in section on line 5—5 of Fig. 2.

Fig. 6 is a view of the construction by which the bracket is clamped to the exterior of the vehicle.

Fig. 7 is a view partly in section and partly in elevation illustrating the construction by which the mirror and its casing is secured to the rod.

The preferred form of the rear vision mirror, herein disclosed, referring now to Fig. 1 of the drawing, comprises a mirror casing 10 rotatably mounted on a rod 11 which in turn is rotatably secured to a bracket 12 adapted to clamp the device to a door margin or frame 13 on the exterior of the vehicle.

In Fig. 5 the bracket 12, which can be formed from a single piece of material, comprises a fixed jaw or shoe 14 adapted to engage a doorframe or the margin of a door 13 of the vehicle received between it and a housing-like member 15 laterally spaced therefrom. The outer surface of the member 15 is provided with a recessed aperture, the defining edges 16 of which are suitably secured in a circumferential groove 17 formed adjacent an end of a sleeve 18. The sleeve 18 projects from the housing-like member 15 of the bracket and is provided with internal and external threads 19 and 20 respectively. A single clamping screw 21, coaxial with the rod 11 having a headless end thereof formed with a screw-driver slot, engages the internal threads 19 of the sleeve and has on its inner end a reduced projection 22, receiving a jaw or shoe 23.

The jaw or shoe 23 is provided with a centrally located aperture 24 formed therein and the reduced projection 22 of the single clamping screw 21 is adapted to extend therethrough and is peened over to form a head 25. The reduced projection 22 is of smaller diameter than the centrally located aperture 24 of the movable jaw so that a rocking or pivotal movement of the jaw about the screw is permitted to allow the jaw to adapt itself to uneven or irregular surfaces to which the device might be secured. The jaw 23 preferably is fashioned with a suitable recess 26, see Fig. 6, to accommodate the head 25 so that it will not extend beyond the inner surface of the movable jaw and interfere with the action of the movable jaw when the jaw is forced against the surface of the door or doorframe when the screw 21 is adjusted.

To facilitate the clamping or gripping action when in use and to prevent the jaw from marring that portion of the vehicle to which the bracket might be attached, sponge rubber or similar sleeve-like members 27 are positioned over the ends of the movable jaw.

The rod 11 is coupled to the bracket 12 by a collar 28 provided with internal threads 29 adjacent one end thereof, adapted to engage the external threads 20 of the sleeve 18 on the bracket 12. The collar 28 at the end opposite to the internal threads 29 is provided with a socket 31 for rotatably receiving an end of the rod 11, the other end of which carries the mirror casing 10.

The end of the rod 11 received within the collar 28 may be anchored in the collar against withdrawal in any suitable way. In the form of the invention herein disclosed, this is done by providing an internal threaded portion 32 on the end of the rod 11 and placing therein a screw 33 having a head 34 adapted to engage a shoulder 35 on the inner wall of the collar 28. The head of the screw 33 and the shoulder 35 are annular and, therefore, do not interfere with relative rotation between the collar and the rod.

To hold the rod against casual rotation relative to the collar 28 and bracket 12 to which the latter is rigidly secured, the cooperating surfaces of the rod and collar are made to press against each other and produce sufficient friction to resist relative movement between these two parts. In the form of the invention herein disclosed, the amount of friction introduced between the collar and the rod may be varied to meet different conditions.

For these purposes, the end of the rod 11, received within the collar 28, is provided with a longitudinal slot 36 shown by broken lines in Fig. 5 and an enlarged bore 37 having an oblique shoulder 38.

The screw 33, intermediate the thread means and the enlarged head 34, is provided with an angular shoulder 39 complementary to the internal oblique shoulder 38 of the rod 11 and adapted to slidably engage the same when the screw is placed in threaded engagement with the internal threads 32 of the rod.

It will be seen that when the screw 33 is placed in engagement with the internal thread means 32 of the rod 11 and is drawn inwardly, a camming action takes place between the shoulders 38 and 39 and the split extremity of the rod 11 is spread or expanded into more or less firm engagement with the collar 28.

It will be noted that the internal oblique shoulder 38 of the rod is spaced inwardly from the end thereof so that, instead of merely the extremity, a substantial portion of the split end of the rod 11 will expand against the collar 28 when the draft screw 33 is screwed in, insuring broad frictional bearing surfaces not subject to quick wear resulting from frequent rotation of the rod in the collar. With this construction, although the rod may be manually rotated within the collar, the frictional resistance to turning movement prevents any casual rotation of the rod which might be caused by vibration or jolting of the vehicle. Because of the broad bearing surfaces, the rod may be easily adjusted by rotation to any desired position with an unusually smooth action and will remain in that position until manually moved therefrom. If desirable, or when necessitated by excess vibration of the vehicle, the frictional resistance may easily be increased by adjusting the screw 33 with respect to the rod 11.

The rod projects longitudinally from the collar and is deflected at a point adjacent the opposite end to form a substantial angle with respect to the axis of rotation of the rod. The deflected end of the rod terminates in a reduced threaded portion 40, referring now to Fig. 7 of the drawing, forming an annular shoulder 41 and the mirror casing 10 is adapted to be rotatably secured thereto.

The mirror casing 10 may be formed in any desired manner and of any suitable material. Preferably, at the upper extremity thereof, there is a plane section defining a bearing surface 42 having a centrally located aperture 43. The reduced portion 40 of the rod is adapted to engage the aperture of the casing, and spring washers 44 and 45 are so positioned with respect to the bearing 42 of the mirror casing that they normally urge suitable gaskets or bearing washers 46 and 47 against the inner and outer surfaces thereof and are held in such engagement by a nut 48 in threaded relationship with the threads of the reduced projection 40 of the rod.

It will be seen that the spring members are so positioned on the reduced projection of the rod that the spring member 44 engages the annular shoulder 41 and urges the washer 46 against the outer surface of the bearing surface while the second spring member engages the nut 48 and urges the washer 47 against the inner side of the bearing surface. This construction provides a very efficient connection between the mounting rod 11 and the mirror casing 10 so that in use, although the mirror casing may be readily rotated or adjusted to any desired position, yet, due to the frictional contact of the washers with the bearing surface, the mirror casing, once adjusted, will remain in the desired position. The amount of resistance to the turning movement of the casing about the rod may be easily varied by adjusting the position of the nut 48 on the reduced projection 40 of the mounting rod.

The casing is formed with a depending flange 49 to receive a mirror 50 and a clamping ring 51 is placed about the periphery of the flange and securely retains the mirror within the casing. If silvered glass is used to form the mirror, gaskets 52, of some suitable resilient material, preferably are positioned adjacent the periphery of the mirror to provide a cushioning means for the glass.

To adjust the mirror casing so that the mirror will be disposed at the desired angle with relation to the rod and bracket, the plane of the bearing surface of the casing is, according to the present invention, made oblique to the plane of the mirror and the axis of rotation of the casing is perpendicular to the plane of the bearing surface so that the axis of rotation of the mirror is oblique to the plane of the mirror.

When the mirror and its casing is rotated about its oblique axis, portions of a large circular field of vision are successively brought into the view of the operator substantially the same as if the mirror were mounted on a ball-and-socket joint and rotated about the joint while inclined to the axis thereof.

According to the present invention, the ball and socket, which is not only expensive to make but more difficult to keep in adjustment, is avoided by providing not only for the rotation of the mirror about an inclined axis but also providing for the rotation of the axis in a vertical plane, this last adjustment being provided for by rotatably mounting the rod 11 in the bracket 10.

To adjust the mirror of the present invention, therefore, the operator, while sitting in his usual driving position, reaches out through the window of the vehicle, and while rotating the mirror to cover the large circular field of vision, rotates the rod about its axis to keep the field of vision on the horizon. It is not necessary, of course, for the operator to separately grasp the rod to adjust it, for, since the axis of rotation of the mirror is at right angles to the rod, the mirror casing itself constitutes a handle by means of which the rod may be rotated.

In use, after the rod and bracket are separated by unscrewing the collar from the sleeve of the bracket, the bracket can be positioned over any desired support, such as the margin of the door or doorframe, and, by rotation of the single clamping screw with respect to the sleeve, the jaw can be moved towards the support and securely clamp the bracket thereof. Through the use of a single screw and central fulcrum jaw, the pressure produced by the screw is evenly distributed to the ends of the movable jaw so that, although the bracket is easily secured to the vehicle, the clamping action produced by the solitary screw and the movable jaw is effective over quite a wide area and this makes for a very rigid construction.

The rod and collar are then secured back in place, and the screw, used to clamp the bracket to the door or doorframe, is then concealed from view by the rod and collar as well as by the bracket so that mischievous or dishonest persons cannot remove the bracket from the vehicle. To further discourage attempt to remove the device, the collar has a plain exterior which may be provided with a hole to receive a special key wrench or spanner not shown.

Variations and modifications may be made within the scope of this invention and portions of the improvements may be used without others.

We claim:

1. In a device of the type described, the combination of a mounting rod; an attaching bracket; a collar secured to the bracket and receiving the opposite end of the rod, said bracket comprising a fixed jaw adapted to engage a support; a movable jaw cooperating therewith; and a screw adapted to clamp the fixed and movable jaws in holding engagement with said support, said screw being located within said collar and concealed by the collar and rod.

2. In an article of the type described, the combination of a supporting rod; a securing bracket; a sleeve carried by said bracket and projecting therefrom; a collar having an end detachably secured to and enclosing said sleeve, said collar being provided at the opposite end with a socket member having an internal annular shoulder and rotatably receiving one end of said rod; thread means positioned internally of said rod; and a screw adapted to engage the internal thread means of the rod and having a head of larger diameter than the internal annular shoulder of the collar to prevent withdrawal of the rod from said collar.

3. In an article of the type described, a securing bracket having a socket; a rod provided with a split end supported within said socket for rotation therein; recessed cam means positioned internally of said rod; and a screw having cam means adapted to engage the cam means of the rod to expand the end of said rod into engagement with said socket whereby casual rotation therebetween is prevented.

4. A device for mounting a rear vision mirror including a mounting rod; a bracket comprising a fixed jaw and a sleeve provided with internal and external threads; screw means engaging the internal threads of the sleeve; a movable jaw rotatably mounted on an end of said screw means whereby the movable jaw can be moved toward said fixed jaw to clamp the bracket to a support; and a collar secured to the opposite end of the mounting rod and engaging the external threads of the sleeve for locking the mounting rod to the bracket.

5. A device for mounting a rear vision mirror including a mounting rod; a securing bracket comprising a fixed jaw and a sleeve provided with internal and external threads; a screw coaxial with the rod engaging the internal threads of the sleeve and having a movable jaw mounted thereon whereby the bracket can be clamped to a support by the jaws; a collar adapted to receive the opposite end of the mounting rod and engaging the external threads of the sleeve, the screw being located within said sleeve and concealed by the rod and collar.

6. In an article of the type described, the combination of a mounting rod; a securing bracket having an internally threaded projecting sleeve secured thereto; a collar secured to said sleeve and adapted to receive one end of the rod, said bracket comprising a fixed jaw adapted to engage a support; a movable jaw; and a screw engaging said movable jaw positioned coaxial with the rod, said screw engaging the internal threads of the sleeve and adapted to move the movable jaw into holding engagement with said fixed jaw to clamp the bracket to a support.

7. In a device of the type described, the combination of an attaching bracket comprising a fixed jaw; a sleeve provided with internal and external threads; a movable jaw; a screw carrying said movable jaw and engaging the internal threads of the sleeve, whereby the bracket can be clamped to a support by the jaws; a collar having internal threads adjacent an end thereof adapted to engage the external threads of the sleeve; a rod having a split end secured within the opposite end of said collar for rotation therein; cam means positioned internally of said rod; and a screw having cam means adapted to engage the first-mentioned cam means to expand the split end of the rod into firm frictional engagement with the collar.

8. In a rear vision mirror including a securing bracket; a projecting sleeve mounted thereon; a collar having an end thereof threaded on said sleeve to enclose the same, said collar being provided at the opposite end thereof with a socket and an internal annular shoulder; a rod having a split end adapted to be received within said socket; cam means positioned internally of said rod; and a screw having cam means adapted to engage the first-mentioned cam means to expand the split end into firm frictional engagement with said socket, said screw being provided with a head portion of a larger diameter than the annular internal shoulder of said collar whereby withdrawal of the rod from the collar is prevented.

9. In an article of the type described, a supporting rod; a securing bracket; a sleeve carried by said bracket and projecting therefrom; means disposed within the sleeve for securing the bracket to a support; a collar secured to and having an end surrounding the sleeve and enclosing the means carried thereby, said collar being provided at the opposite end with a socket member having an internal shoulder and rotatably receiving one end of said rod; thread means positioned internally of said rod; and a screw adapted to engage the internal thread means of the rod and having a head of larger diameter than the internal annular shoulder of the collar to prevent withdrawal of the rod from said collar.

10. A securing bracket comprising a housing having a fixed jaw spaced therefrom and adapted to receive a support therebetween; a jaw within the housing movable into clamping engagement with the support; threaded means mounted in the housing for moving the movable jaw; a rod; and a threaded collar engaging the rod and housing and covering and concealing the threaded means.

GUSTAVE F. BAHR.
JOSEPH O. THIBAULT.